United States Patent
Goldberg (10) Patent No.: US 7,197,746 B1
(45) Date of Patent: Mar. 27, 2007

(54) MULTIPURPOSE LEXICAL ANALYZER

(75) Inventor: Robert N. Goldberg, Emerald Hills, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 714 days.

(21) Appl. No.: 10/459,923

(22) Filed: Jun. 12, 2003

(51) Int. Cl.
*G06F 9/45* (2006.01)

(52) U.S. Cl. .................. 717/140; 717/142; 717/143

(58) Field of Classification Search ............. 717/140, 717/142, 143
See application file for complete search history.

(56) References Cited

U.S. PATENT DOCUMENTS

| | | | |
|---|---|---|---|
| 5,737,608 A * | 4/1998 | Van De Vanter | 717/112 |
| 5,963,742 A * | 10/1999 | Williams | 717/143 |
| 5,991,539 A * | 11/1999 | Williams | 717/143 |
| 6,282,698 B1 * | 8/2001 | Baker et al. | 717/136 |
| 6,353,925 B1 * | 3/2002 | Stata et al. | 717/112 |
| 6,574,790 B1 * | 6/2003 | Abramson et al. | 717/100 |
| 6,721,943 B2 * | 4/2004 | Krishnaiyer et al. | 717/140 |
| 7,003,764 B2 * | 2/2006 | Allison | 717/143 |
| 2004/0031024 A1 * | 2/2004 | Fairweather | 717/143 |

OTHER PUBLICATIONS

P. Schnorf, "Dynamic Instantiation and Configuration of Functionally Extended, Efficient Lexical Analyzers", 1988, ACM, p. 93-102.*

S. Haden, "Lexical_Analyser_G: A Multi-Language Lexical Analysis Package", 1990, ACM, p. 131-139.*

Resnick, et al., "INSCAN: a syntax-directed language processor", 1968, ACM, p. 423-432.*

M.E. Lesk & E. Schmidt; "Lex—A Lexical Analyzer Generator", The Lex & Yacc Page, http://dinosaur.compilertools.net/lex/index.html, printed Dec. 24, 2002, 21 pages.

Class PreProcessor; taems.preprocessor public class; http://dis.cs.umass.edu/research/mass/api/taems/taems/preprocessor/PreProcessor.html; printed Dec. 25, 2002; 7 pgs.

Class StringTokenizer; com.Ostermiller.util public class; http://ostermiller.org/utils/doc/com/Ostermiller/util/String Tokenizer.html; printed Dec. 24, 2002; 18 pages.

Class Pretty Printer; Lexicon Interface public abstract class PrettyPrinter; http://www.cs.rochester.edu/u/myros/doc/ParserTools/API/LexiconInter.../PrettyPrinter.html; printer Dec. 25, 2002; 7 pages.

Project 3: StreamTokenizer; public class java.util.StreamTokenizer; http://www.csue.berkeley.edu/~shenemey/summer61b/proj3/token.html; printed Aug. 20, 1999; 5 pages.

* cited by examiner

*Primary Examiner*—Wei Zhen
*Assistant Examiner*—Qamrun Nahar
(74) *Attorney, Agent, or Firm*—Osha Liang LLP (57) ABSTRACT

A method for lexically analyzing an input stream including invoking a multipurpose lexical analyzer, wherein invoking the multipurpose lexical analyzer comprises examining a parameter setting, scanning the input stream to obtain a token using a token definition, and determining whether to ignore the token using the parameter setting, returning the token to a calling process if the token is to be processed.

27 Claims, 6 Drawing Sheets

MULTIPURPOSE LEXICAL ANALYZER

FIELD OF THE INVENTION

Embodiments of the invention generally relate to the field of lexical analyzers.

BACKGROUND OF INVENTION

A lexical analyzer breaks an input stream of characters into programming language tokens (or simply "tokens"). A token is the basic component of source code. The tokens are typically categorized as one of five classes of tokens that describe their functions (constants, identifiers, operators, reserved words, and separators), in accordance with the rules of the programming language. For example, a lexical analyzer may take source code as input and break the source code into tokens to produce output that may be used by a parser to generate byte code.

Traditional lexical analyzers were typically designed to perform a single specific task such as pre-processing source code, compiling source code, pretty printing, etc. These lexical analyzers were typically constructed by hand or using a generic lexical analyzer generator. Each such lexical analyzer typically incorporated certain assumptions about what constituted a token. The assumptions typically included generic rules as to what constituted a token without addressing specific implementation details of a particular programming language. Additionally, the traditional lexical analyzers allowed the user to manipulate the actions that could be executed when a particular token, according to the assumptions incorporated into the lexical analyzers, was encountered.

Figure 1:
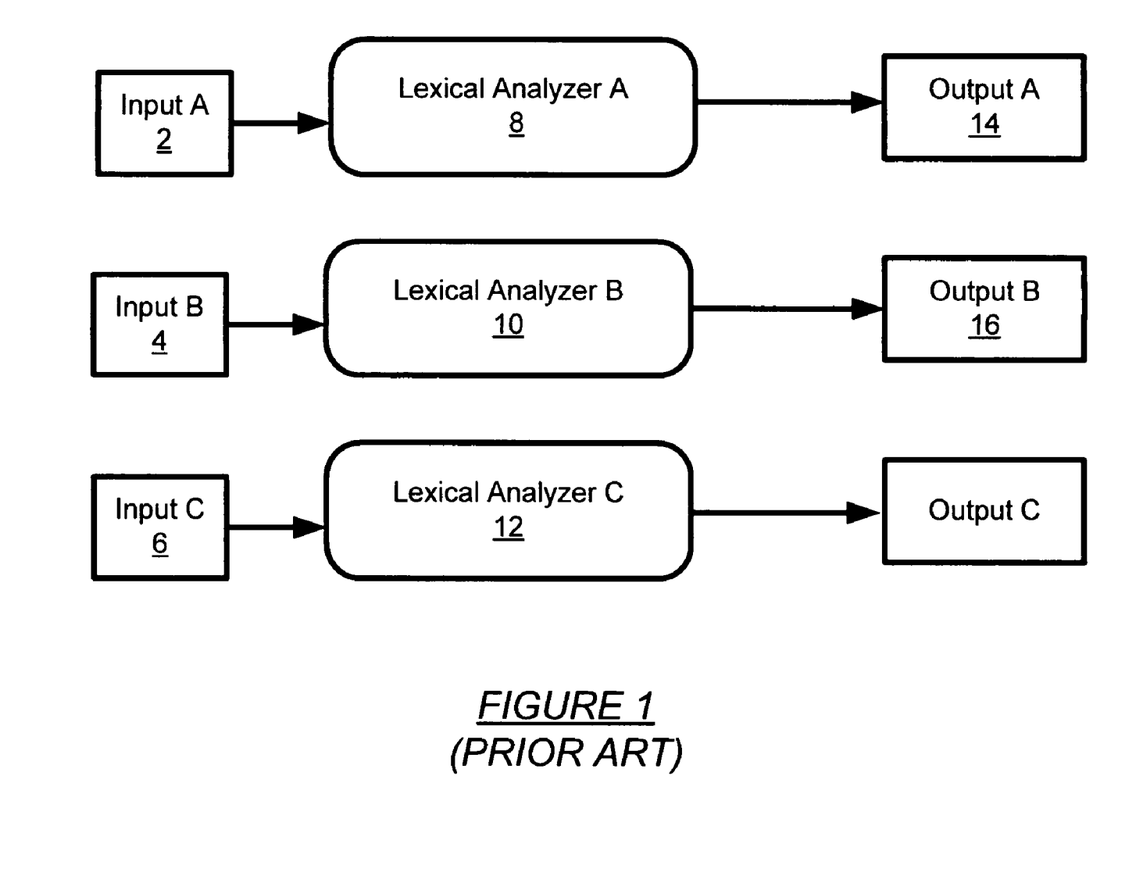
FIG. 1 illustrates a set of typical lexical analyzers.

FIG. 1 illustrates a set of prior art lexical analyzers. Inputs A, B, and C (2, 4, and 6, respectively in FIG. 1) correspond to source code, or any other type of input stream that requires lexical analysis. Lexical Analyzers A, B, and C (8, 10, and 12, respectively in FIG. 1) are lexical analyzers designed for a specific function. For example, Lexical Analyzer A's (8) function may be to compile source code. Thus, Lexical Analyzer A (8) would include lexical rules to ignore and discard comments and white space present in input A (2) to produce output A (14). Similarly, Lexical Analyzer B's (10) function may be pretty printing. Thus, Lexical Analyzer B (10) would include rules to ignore white space and preserve comments in the input B (4) to produce output B (16). Further, lexical analyzer C (12) may be a pre-processor that preserves both comments and white space.

SUMMARY OF INVENTION

In general, in one aspect, the invention relates to a method for lexically analyzing an input stream comprising invoking a multipurpose lexical analyzer, wherein invoking the multipurpose lexical analyzer comprises examining a parameter setting, scanning the input stream to obtain a token using a token definition, and determining whether to ignore the token using the parameter setting, returning the token to a calling process if the token is to be processed.

In general, in one aspect, the invention relates to a multipurpose lexical analyzer comprising a programming language specific class defining at least one programming language specific token and at least one configurable parameter, and a parameter setting for configuring the at least one configurable parameter.

In general, in one aspect, the invention relates to a multipurpose lexical analyzer comprising a token definition defining a plurality of tokens and at least one configurable parameter, and a parameter setting configuring at least one selected from the group consisting of at least one of the plurality of tokens and the at least one configurable parameter.

In general, in one aspect, the invention relates to a computer-readable medium having recorded thereon instructions executable by a processor, the instructions for invoking a multipurpose lexical analyzer, wherein invoking the multipurpose lexical analyzer comprises examining a parameter setting, scanning the input stream to obtain a token using a token definition, and determining whether to ignore the token using the parameter setting, returning the token to a calling process if the token is to be processed.

In general, in one aspect, the invention relates to an apparatus for lexically analyzing an input stream comprising means for invoking a multipurpose lexical analyzer, wherein invoking the multipurpose lexical analyzer comprises examining a parameter setting, means for scanning the input stream to obtain a token using a token definition, and means for determining whether to ignore the token using the parameter setting, means for returning the token to a calling process if the token is to be processed.

Other aspects and advantages of the invention will be apparent from the following description and the appended claims.

DETAILED DESCRIPTION

Exemplary embodiments of the invention will be described with reference to the accompanying drawings. Like items in the drawings are denoted by the same reference numbers through out for consistency.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 2:
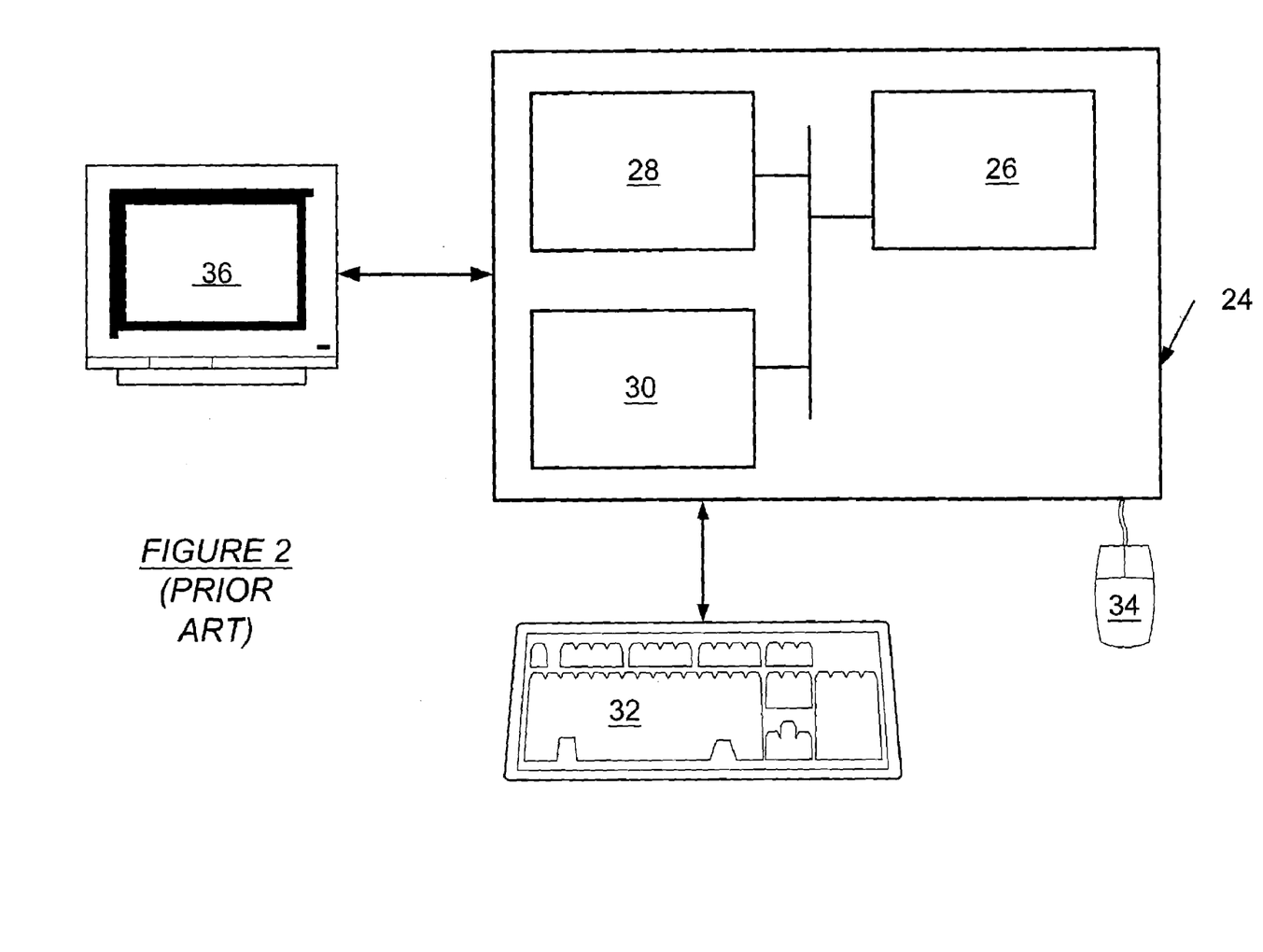
FIG. 2 illustrates a typical computer system.

The invention may be implemented on virtually any type computer regardless of the platform being used. For example, as shown in FIG. 2, a typical computer (24) includes a processor (26), associated memory (28), a storage device (30), and numerous other elements and functionalities typical of today's computers (not shown). The computer (24) may also include input means, such as a keyboard (32) and a mouse (34), and output means, such as a monitor (36). Those skilled in the art will appreciate that these input and output means may take other forms.

Figure 3:
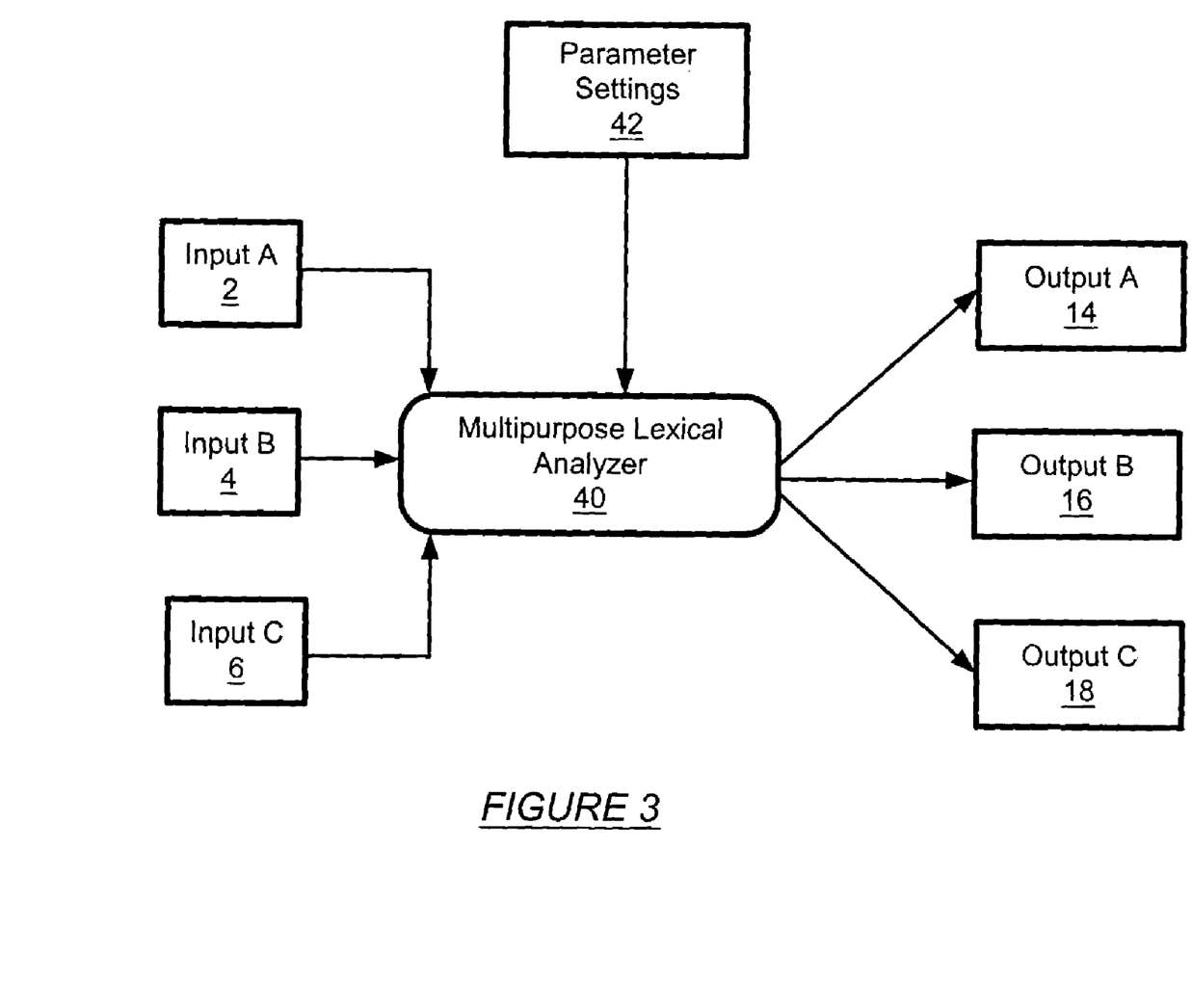
FIG. 3 illustrates a multipurpose lexical analyzer in accordance with one embodiment of the invention.

In general, the invention relates to a multipurpose lexical analyzer and a method for using the multipurpose lexical analyzer. FIG. 3 illustrates a multipurpose lexical analyzer in accordance with one embodiment of the invention. The multipurpose lexical analyzer (MLA) (40) includes a description of tokens that are present in specific programming language (e.g., Java, Structured Query Language (SQL), etc.) In addition the MLA (40) includes functionality to implement filters, flags, and additional configurable options (e.g., buffering for error printing) that are configured using a parameter settings (42). The filters, flags, and additional configurable options may be generic to multiple tasks or specific to a single task. The parameter settings (42) may be statically configured or dynamically configured during execution of the MLA (40).

The flexible nature of the MLA (40) allows the MLA (40) to receive inputs from multiple sources (e.g., Input A (2), Input B (4), Input C (6)) and produce different types of outputs depending on which filters, flags, and additional configurable options are set. For example, if a user required Input A to be compiled, then the user may set the parameter settings (42) to include the necessary information to configure the MLA (40) to ignore and discard white space and comments to produce output A (14). Using the same MLA (40), the user could then proceed to pretty print Input B (4) to produce output B (16) by configuring the MLA (40), via the parameter settings (42), to ignore white space and preserve comments. Further, the user may then proceed to pre-process Input C (6) to produce Output C (18) by configuring the MLA (40) to preserve both white space and comments. Those skilled in the art will appreciate that all inputs (i.e., Input A (2), Input B (4), Input C (6)) are typically written in the same programming language (e.g., Structured Query Language, the Java™ Programming Language, etc.).

While the previous example indicates that the MLA (40) may be modified, via the parameter settings (42), to process different inputs, in one embodiment of the invention, the parameter settings (42) may be altered dynamically for the processing of a single input file (i.e., during the processing of input A (2)).

Figure 4:
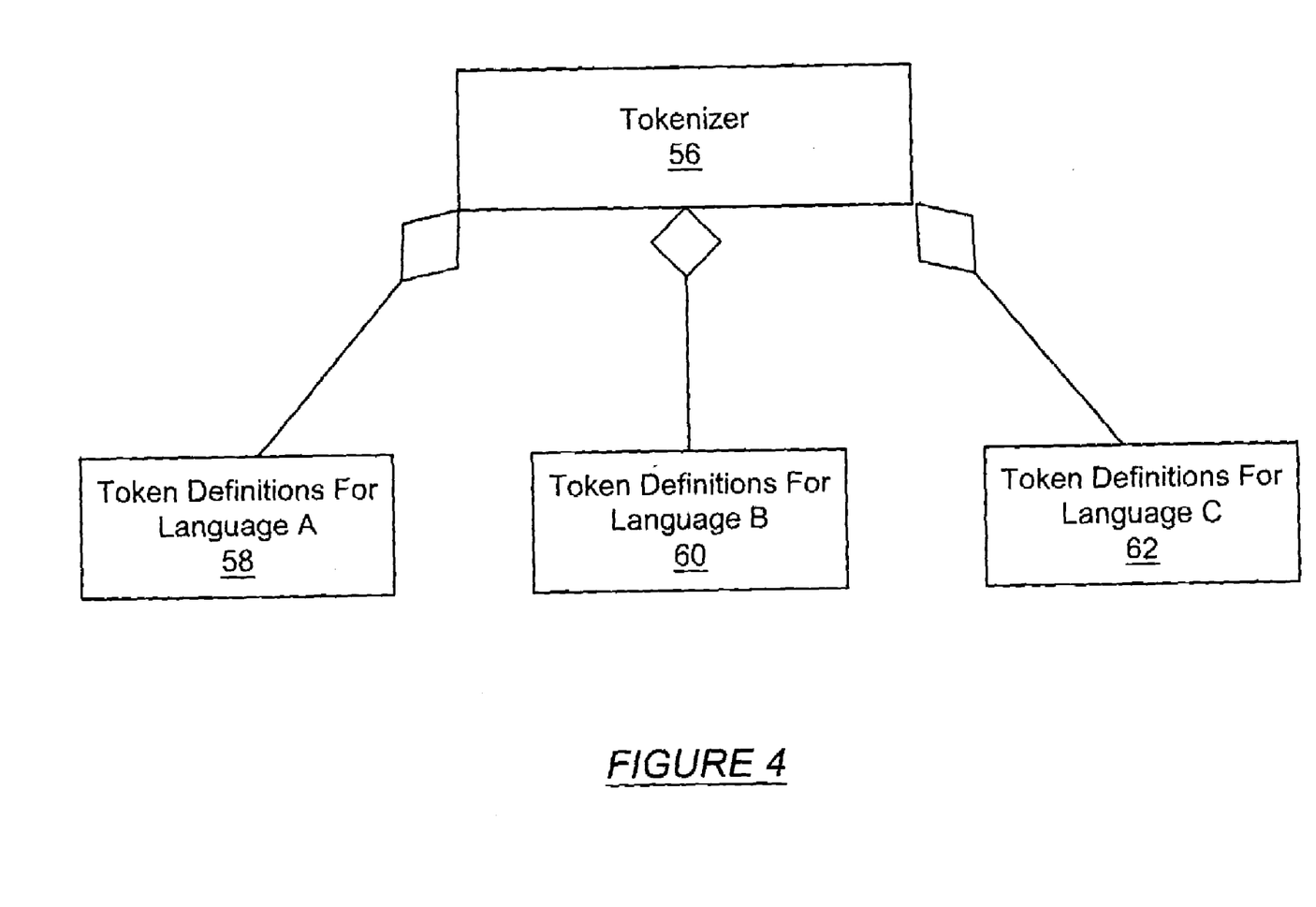
FIG. 4 illustrates a class diagram in accordance with one embodiment of the invention.

FIG. 4 illustrates a class diagram in accordance with one embodiment of the invention. Tokenizer class (56) corresponds to a base class. Tokenizer class (56) includes definitions for a number of common tokens, such as white space, numeric laterals, dipthong operators, as well a series of common configurable parameters (e.g., common filters, flags, and additional configurable options) that allow the MLA (40 in FIG. 3) to filter all token types defined in the Tokenizer class (56). Further, Tokenizer class (56) includes subroutines to aid the MLA (40 in FIG. 3) in parsing the input stream.

Subclasses, denoted as (58)–(62) in FIG. 4, are program language specific classes that define more specialized tokens. For example, if a user wants to process an SQL file, then subclass (58) would include specialized token definitions (i.e., definitions for program language specific tokens) corresponding to SQL.

In one embodiment of the filters, flags, and additional configurable options specific to the programming language (i.e., programming language specific configurable parameters) are defined in a subclass (e.g., 58 in FIG. 4), and flags, filters, and additional configurable options common to multiple programming languages are defined in a base class (e.g., Tokenizer class (56) in FIG. 4).

In one embodiment of the invention, the Tokenizer class (56) takes an input stream and parses the stream into "tokens" of various languages, which are subsequently read one at a time. The Tokenizer class (56) recognizes identifiers, whole numbers, decimal numbers, floating point numbers, hexadecimal constants, quoted strings, single character and dipthong operators, punctuation characters, white space, and comments. Further, the Tokenizer class (56) includes functionality to handle numeric literals, and includes functionality to break at the "." in identifiers to allow expressions involving identifiers to be parsed correctly. Further, the Tokenizer class (56) may be implemented to handle token "look-ahead" of a user specified number of tokens.

In one embodiment of the invention, one subclass (58) of the Tokenizer class (56) is a JavaTokenizer class. The JavaTokenizer class takes an input stream and parses the input stream into "tokens" of the Java language, which are subsequently read one at a time. The JavaTokenizer recognizes identifiers, whole numbers, decimal numbers, floating point numbers in all the formats corresponding to the Java Language Specification. Further, the JavaTokenizer class recognizes hexadecimal constants, quoted strings, single character operators and punctuation characters, white space, and comments expressed in C-style, C++-style, and Java-Doc-style.

In one embodiment of the invention, one subclass (e.g., Token definitions (60) in FIG. 4) of the Tokenizer class (56) is an SQLTokenizer class. The SQLTokenizer class takes an input stream and parses the stream into "tokens" of the SQL query language, which are subsequently read one at a time. The SQLTokenizer is able to recognize identifiers, whole numbers, decimal numbers, floating point numbers, hexadecimal constants, quoted strings, single character operators and punctuation characters, white space, and comments expressed in SQL. The SQLTokenizer class also includes a flag to control whether a "." that occurs between alphabetic characters should break the scan and be returned as a punctuation character, or whether the "." should be included as part of an identifier. Detailed parsing of SQL requires the former, but cursory parsing of variable names is easier using the latter setting. Further, the SQLTokenizer class understands SQL quotes in which the quote character is doubled to signify the intention to quote.

Those skilled in the art will appreciate that the preceding discussion of the Tokenizer class (56), and the JavaTokenizer and SQLTokenizer subclasses are included as examples and other classes and subclasses are within the scope of the invention.

Figure 5:
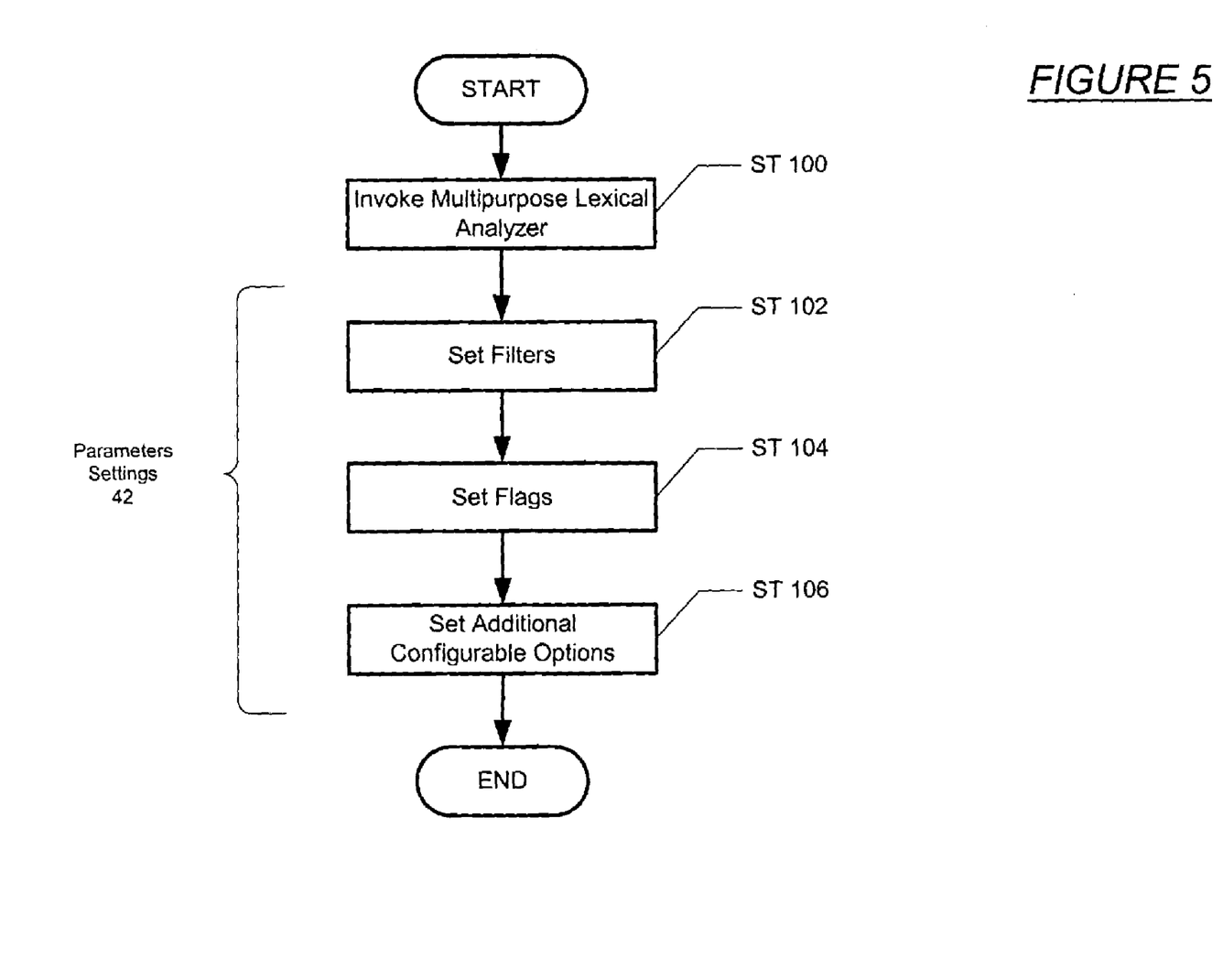
FIG. 5 illustrates a flowchart in accordance with one embodiment of the invention.

FIG. 5 illustrates a flowchart in accordance with one embodiment of the invention. Initially, an application, such as a parser, creates an instance of the MLA (40 in FIG. 3) (Step 100). Depending on the programming language in which the input file was written, the MLA (40 in FIG. 3) may be invoked by initializing the Tokenizer (56 in FIG. 4) class or a more specific subclass (e.g., JavaTokenizer, SQLTokenizer, etc.). During the invocation of the MLA (40 in FIG. 3) or the subsequent to the invocation of the MLA (40 in FIG. 3), parameter settings (42) are used to set the filters (Step 102), set flags (Step 104), and set additional parameters (echo input, error printing, input stream buffering, etc.) (Step 106). Those skilled in the art will appreciate that the order in which the flags, filters, and additional configurable options are set may vary with implementation. Further, Steps 102–106 may not all occur in every implementation.

Those skilled in the art will appreciate that when an instance of the MLA (40) is initially created the MLA (40) may be configured using default parameter settings (42) and then subsequently modified by changing various parameter settings during execution. Alternatively, the parameter settings (42) may be passed in a call which initially triggers creation of an instance of an MLA (40), or during a request to retrieve a next token.

Figure 6:
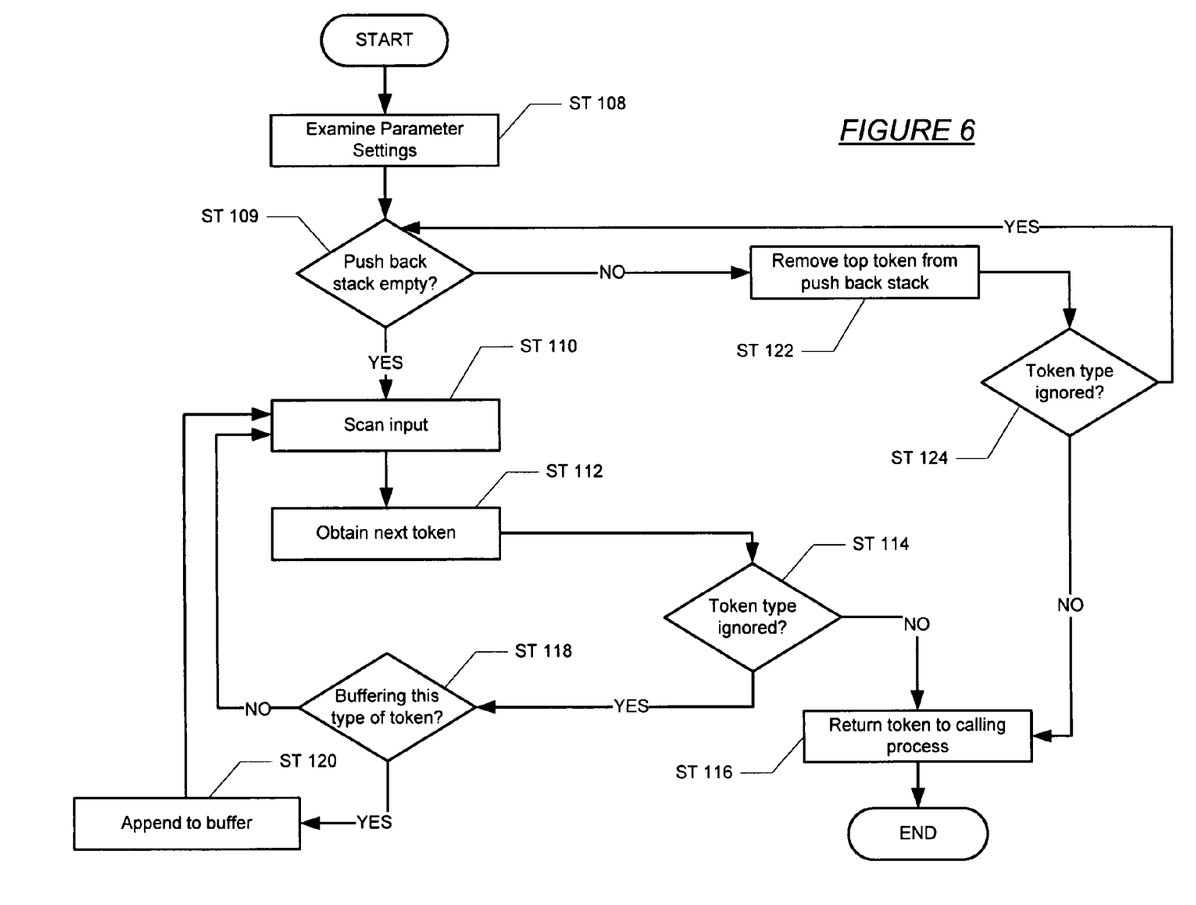
FIG. 6 illustrates a flowchart in accordance with one embodiment of the invention.

FIG. 6 illustrates a flowchart in accordance with one embodiment of the invention, once an instance of the MLA (40) has been created, a calling process, such as a parser, may invoke the MLA (40). Upon invocation of an instance of the MLA (40) by the calling process, the MLA (40) first examines the parameter settings (42) to determine which flags, filters and additional configurable parameters have been set (Step 108).

The MLA then determines whether a push back stack is empty (Step 109). Those skilled in the are will appreciate that the push back stack may be implemented as a logical stack (i.e., an array coded to operate as a stack, etc.). In one embodiment of the invention, the push back stack is used for token "look-ahead." Further, the push back stack is typically handled by the calling process. If the push back stack is empty then the input is subsequently scanned (Step 110) and a token is obtained (Step 112). The MLA (40) then determines whether the token is to be ignored (Step 114). This determination is made based on the parameter settings (42), If the token is not to be ignored then the token is returned to the caller (e.g., a parser) (Step 116).

If the token is to be ignored then the MLA (40) determines if this type of token is to be buffered (Step 118). If buffering is enabled then the token is appended to the buffer (Step 120), otherwise the token is discarded. This implementation of the buffer allows the calling process to implicitly retain ignored tokens (e.g., comments and white space) without having to explicitly code rules for checking for the ignored tokens. According, this implementation allows the MLA (40) to conditionally ignore certain token types while conditionally echoing some or all of these token to the buffer.

Returning to FIG. 6, if the push back stack is not empty (Step 109), then the MLA (40) removed the top token from the push back stack (Step 122). The MLA (40) then determines whether the token type corresponding to the removed token is ignored (Step 124). If the removed token is to be ignored then MLA (40) proceeds to step 109. Otherwise, the removed token is returned to the calling process (Step 116). The MLA (40) then proceeds to repeat steps 108–124.

In one embodiment of the invention, the MLA (40) includes functionality to preserve the original appearance of the parsed token. This allows the calling process to output the token as it originally appears in the input text without requiring additional processing of the extracted token. For example, in the Java™ programming language the string: ["Hi, \"you\" "] would be parsed into [Hi, "you"] but may be output in its original form (i.e., ["Hi, \"you\" "]).

In one embodiment of the invention, the multipurpose lexical analyzer is generated using a lexical analyzer generator such as LEX.

Embodiments of the invention may have one or more of the following advantages. A framework is provided for creating a multipurpose lexical analyzer. Further, users can use the same lexical analyzer for multiple tasks (e.g., compiling, preprocess, pretty printing, etc.). Further, users can specify tokens specific to a programming language, using a subclass. Further, users can modify the flags, additional configurable options, and filters dynamically. Further, users can combine various separate tasks (i.e., pre-processing, compiling, etc.) into one combined task within the lexical analyzer. Further, functionality is provided to pre-process a high level specification (i.e., enhanced source code) into un-enhanced source code while preserving comments and formatting in the generated un-enhanced source code.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for lexically analyzing an input stream comprising:
   invoking a multipurpose lexical analyzer, wherein invoking the multipurpose lexical analyzer comprises examining a parameter setting; and
   returning a subset of a plurality of tokens from the input stream to a calling process by the multipurpose lexical analyzer, wherein returning the subset of the plurality of tokens to the calling process comprises:
      scanning the input stream to obtain the plurality of tokens using token definitions;
      for each token of the plurality of tokens:
         determining whether to ignore the token using the parameter setting; echoing the token to a buffer, if the token is to be ignored; and
         returning the token to the calling process if the token is not to be ignored;
   wherein the subset of the plurality of tokens comprises at least one token of the plurality of tokens,
   wherein at least one action selected from a group consisting of: pre-processing to generate output to a monitor, compiling to generate an application, and printing to generate output to a monitor is performed on the subset of the plurality of tokens.

2. The method of claim 1, wherein echoing further comprises echoing if a token type corresponding to the token is enabled.

3. The method of claim 1, further comprising:
   determining whether a stored token is present in a push back stack prior to scanning the input stream;
   determining whether to ignore the stored token using the parameter setting if the stored token is in the push back stack; and
   returning the stored token to a calling process if the stored token is not to be ignored.

4. The method of claim 1, wherein the token definition is defined in a programming language specific class.

5. The method of claim 1, wherein the parameter setting is defined using a programming language specific class.

6. The method of claim 1, wherein the parameter setting configures at least one selected from the group consisting of a flag, a filter, and an additional configurable option.

7. The method of claim 1, wherein the multipurpose lexical analyzer includes functionality to maintain both a parsed form of the token and an original form of the token.

8. The method of claim 1, wherein the parameter setting is dynamically configured.

9. A multipurpose lexical analyzer on a computer system comprising: a processor
   a programming language specific class defining a plurality of programming language specific tokens and at least one configurable parameter; and
   a parameter setting for configuring the at least one configurable parameter,
   wherein the multipurpose lexical analyzer is configured to:
      examine the parameter setting; and
      return a subset of the plurality of programming language specific tokens from an input stream to a calling process, wherein returning the subset of the plurality of programming language specific tokens to the calling process comprises:

scanning the input stream to obtain the plurality of programming language specific tokens using token definitions;

for each programming language specific token of the plurality of programming language specific tokens:

determining whether to ignore the programming language specific token using the parameter setting; a buffer configured to echo the programming language specific token, if the programming language specific token is to be ignored; and returning the programming language specific token to a calling process if the programming language specific token is not to be ignored;

wherein the subset of the plurality of programming language specific tokens comprises at least one token of the plurality of programming language specific tokens, wherein at least one action selected from the group consisting of: pre-processing to generate output to a monitor, compiling to generate an application, and printing to generate output to a monitor is performed on the subset of the plurality of programming language specific tokens.

10. The multipurpose lexical analyzer of claim 9, wherein the buffer echoes the at least one programming language specific token if a token type corresponding to the at least one programming language specific token is enabled.

11. The multipurpose lexical analyzer of claim 9, wherein the multipurpose lexical analyzer includes functionality to maintain both a parsed form of at least one programming language specific token of the plurality of programming language specific tokens and an original form of the at least one programming language specific token from an input stream.

12. The multipurpose lexical analyzer of claim 9, wherein the at least one configurable parameter is at least one selected from the group consisting of a flag, a filter, and an additional configurable option.

13. The multipurpose lexical analyzer of claim 9, wherein the at least one configurable parameter is dynamically configured.

14. A multipurpose lexical analyzer on a computer system comprising: a processor a token definition defining a plurality of tokens and at least one configurable parameter; and a parameter setting configuring at least one selected from the group consisting of at least one of the plurality of tokens and the at least one configurable parameter, wherein the multipurpose lexical analyzer is configured to:

examine the parameter setting; and return a subset of the plurality of tokens from an input stream to a calling process, wherein returning the subset of the plurality of tokens to the calling process comprises:

scanning the input stream to obtain the plurality of tokens using the token definition;

for each token of the plurality of tokens:

determining whether to ignore the token using the parameter setting; a buffer configured to echo the token, if the token is to be ignored; and returning the token to the calling process if the token is not to be ignored;

wherein the subset of the plurality of tokens comprises at least one token of the plurality of tokens, wherein at least one action selected from the group consisting of: pre-processing to generate output to a monitor, compiling to generate an application, and printing to generate output to a monitor is performed on the subset of the plurality of tokens.

15. The multipurpose lexical analyzer of claim 14, wherein the buffer echoes at least one of the plurality of tokens if a token type corresponding to the token is enabled.

16. The multipurpose lexical analyzer of claim 14, wherein the parameter setting is dynamically modified.

17. The multipurpose lexical analyzer of claim 14, wherein the at least one configurable parameter is at least one selected from the group consisting of a flag, a filter, and an additional configurable option.

18. The multipurpose lexical analyzer of claim 14, wherein the multipurpose lexical analyzer comprises functionality to maintain both a parsed form of the token and an original form of the token.

19. A computer-readable medium having recorded thereon instructions executable by a processor, the instructions for:

invoking a multipurpose lexical analyzer, wherein invoking the multipurpose lexical analyzer comprises examining a parameter setting; and returning a subset of a plurality of tokens from an input stream to a calling process by the multipurpose lexical analyzer, wherein returning the subset of the plurality of tokens to the calling process comprises:

scanning the input stream to obtain the plurality of tokens using token definitions;

for each token of the plurality of tokens:

determining whether to ignore the token using the parameter setting; echoing the token to a buffer, if the token is to be ignored; and returning the token to the calling process if the token is not to be ignored;

wherein the subset of the plurality of tokens comprises at least one token of the plurality of tokens, wherein at least one action selected from the group consisting of: pre-processing to generate output to a monitor, compiling to generate an application, and pretty printing to generate output to a monitor is performed on the subset of the plurality of tokens.

20. The computer-readable medium of claim 19, wherein the token is echoed to the buffer if the token is ignored and buffering for a token type corresponding to the token is enabled.

21. The computer-readable medium of claim 19, further comprising instructions for:

determining whether a stored token is present in a push back stack prior to scanning the input stream;

determining whether to ignore the stored token using the parameter setting if the stored token is in the push back stack; and returning the stored token to a calling process if the stored token is not to be ignored.

22. The computer-readable medium of claim 19, wherein the token is defined using a programming language specific class.

23. The computer-readable medium of claim 19, wherein the parameter setting is defined using a programming language specific class.

24. The computer-readable medium of claim 19, wherein the parameter setting configures at least one selected from the group consisting of a flag, a filter, and an additional configurable option.

25. The computer-readable medium of claim 19, wherein the multipurpose lexical analyzer includes functionality to maintain both a parsed form of the token and an original form of the token.

26. The computer-readable medium of claim 19, wherein the parameter setting is dynamically configured.

27. An apparatus for lexically analyzing an input stream comprising: a processor     means for invoking a multipurpose lexical analyzer, wherein invoking the multipurpose lexical analyzer comprises examining a parameter setting; and     means for returning a subset of a plurality of tokens from the input stream to a calling process by the multipurpose lexical analyzer, wherein returning the subset of the plurality of tokens to the calling process comprises:

scanning the input stream to obtain the plurality of tokens using token definitions;

for each token of the plurality of tokens:

determining whether to ignore the token using the parameter setting; echoing the token to a buffer, if the token is to be ignored; and             returning the token to the calling process if the token is not to be ignored;

wherein the subset of the plurality of tokens comprises at least one token of the plurality of tokens, wherein at least one action selected from the group consisting of: pre-processing to generate output to a monitor, compiling to generate an application, and pretty printing to generate output to a monitor is performed on the subset of the plurality of tokens.

\* \* \* \* \*